United States Patent
Klingauf

(10) Patent No.: US 11,002,749 B2
(45) Date of Patent: May 11, 2021

(54) CALIBRATION METHOD

(71) Applicant: Roche Diagnostics Operations, Inc., Indianapolis, IN (US)

(72) Inventor: Mirko Klingauf, Schlieren (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 247 days.

(21) Appl. No.: 16/136,727

(22) Filed: Sep. 20, 2018

(65) Prior Publication Data

US 2019/0094249 A1 Mar. 28, 2019

(30) Foreign Application Priority Data

Sep. 26, 2017 (EP) ..................................... 17193173

(51) Int. Cl.
*G01N 35/00* (2006.01)

(52) U.S. Cl.
CPC . *G01N 35/00693* (2013.01); *G01N 35/00623* (2013.01); *G01N 2035/00653* (2013.01); *G01N 2035/00702* (2013.01)

(58) Field of Classification Search
CPC ....... G01N 35/00693; G01N 35/00623; G01N 2035/00653; G01N 2035/00702; G01N 33/48
See application file for complete search history.

(56) References Cited

U.S. PATENT DOCUMENTS

| 5,554,539 A | 9/1996 | Chadney et al. |
| 8,681,896 B1 | 3/2014 | Chen et al. |

(Continued)

FOREIGN PATENT DOCUMENTS

| EP | 2347709 A2 | 7/2011 |
| JP | 2000-180453 A | 6/2000 |

(Continued)

OTHER PUBLICATIONS

Jansen et al., Trueness Verification and Traceability Assessment of Results from Commercial Systems for Measurement of Six Enzyme Activities in Serum An International Study in the EC4 Framework of the Calibration 2000 Project, Mar. 6, 2006, Clinica Chimica Acta 368, pp. 160-167 (Year: 2006).*

*Primary Examiner* — Toan M Le
(74) *Attorney, Agent, or Firm* — Roche Diagnostics Operations, Inc.

(57) ABSTRACT

A computer-implemented method of calibrating an in-vitro diagnostic analyzer is disclosed. The method includes executing a multi-point calibration procedure including measuring a plurality of calibrator levels and thereby obtaining a plurality of respective calibration points. The method further includes calculating a result of the multi-point calibration procedure and determining failure or passing of the multi-point calibration procedure based on the calculated result. In case of failure of the multi-point calibration procedure, the method includes determining if failure is related to one or more individual failed calibration point(s), and in the affirmative, triggering a repetition of measuring the calibrator level(s) only with respect to the failed calibration point(s) and re-calculating the result of the multi-point calibration procedure after replacing only the failed calibration point(s) with the newly obtained calibration point(s).

15 Claims, 11 Drawing Sheets

(56) References Cited

U.S. PATENT DOCUMENTS

2012/0215462 A1    8/2012   Goode, Jr. et al.
2014/0157859 A1    6/2014   Darmstadt et al.
2015/0355207 A1* 12/2015   Pollack ............ G01N 35/00663
                                                                                 436/501
2016/0070675 A1    3/2016   Schmitt et al.

FOREIGN PATENT DOCUMENTS

| JP | 2015-225032 A | 12/2015 |
| WO | 2003/083907 A2 | 10/2003 |
| WO | 2005/011489 A1 | 2/2005 |
| WO | 2008/015264 A2 | 2/2008 |

* cited by examiner

CALIBRATION METHOD

CROSS-REFERENCE TO RELATED APPLICATIONS

This application is a continuation of EP 17193173.6, filed Sep. 26, 2017, which is hereby incorporated by reference.

BACKGROUND

The present disclosure generally relates to a computer-implemented method of calibrating an in-vitro diagnostic analyzer.

In medicine, doctor's diagnosis and patient treatment often relies on the measurement of the concentration of analytes, or other parameters, in a patient sample. This measurement is typically carried out by in-vitro diagnostic analyzers that can be configured to analyze certain types of samples and detect certain types of analytes using various detecting technologies. As the life of patients may depend on the precision and the reliability of such measurements, it is important that the instruments perform correctly.

It is a general requirement for in-vitro diagnostic analyzers to implement a set of Quality Control (QC) procedures in order to check that they are working correctly.

One of these procedures is calibration. In most cases, calibration is performed using standard solutions, with known concentrations. In this way it is possible to correlate a measured signal to a quantitative result. Calibration should be performed more or less frequently depending on the system and other variable factors which may affect performance.

Sometimes errors may occur during calibration and a calibration failure is reported. In most cases, it is not clear what the cause of the failure is. In most cases, the cause of failure is due to random errors, e.g., due to interferences during the measurement e.g., presence of air bubbles, dirt, contaminants, due to pipetting errors, and the like.

As a consequence, rather than investigating what the cause of the failure is, the calibration procedure is normally repeated in the hope that the next time no failure is reported.

The effective throughput and usability as well as the costs of running of an in-vitro diagnostic analyzer may be affected by the fact that a significant time may have to be dedicated to the execution and repetition of calibration procedures. This applies even more to those in-vitro diagnostic analyzers that are configured to process different samples and test for different analytes in a random sequence and where different reagents according to the type of sample and/or to the analytes of interest are used, meaning that different calibration procedures for different sample/analyte/reagent combinations may be required and on a more frequent basis. Moreover, the time and costs for executing calibration procedures increase as the number of calibrator levels that are required for the same calibration procedure increases.

Therefore, there is a need for a method of calibrating an in-vitro diagnostic analyzer that minimizes the time spent for calibration procedures, minimizes delays of routine operation due to missing calibration, and minimizes the use of calibrators, therefore saving costs and preventing waste of expensive materials.

SUMMARY

According to the present disclosure, a computer-implemented method of calibrating an in-vitro diagnostic analyzer. The method can comprise executing a multi-point calibration procedure comprising measuring a plurality of calibrator levels and thereby obtaining a plurality of respective calibration points (1-$n$), calculating a result of the multi-point calibration procedure and determining failure or passing of the multi-point calibration procedure based on the calculated result, and, in the case of failure of the multi-point calibration procedure, determining if failure is related to one or more individual failed calibration point(s) (1-$n$) and, in the affirmative, triggering a repetition of measuring the calibrator level(s) only with respect to the failed calibration point(s) and re-calculating the result of the multi-point calibration procedure after replacing only the failed calibration point(s) with the newly obtained calibration point(s).

Accordingly, it is a feature of the embodiments of the present disclosure to provide for a method of calibrating an in-vitro diagnostic analyzer that minimizes the time spent for calibration procedures, minimizes delays of routine operation due to missing calibration, and minimizes the use of calibrators, therefore saving costs and preventing waste of expensive materials. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
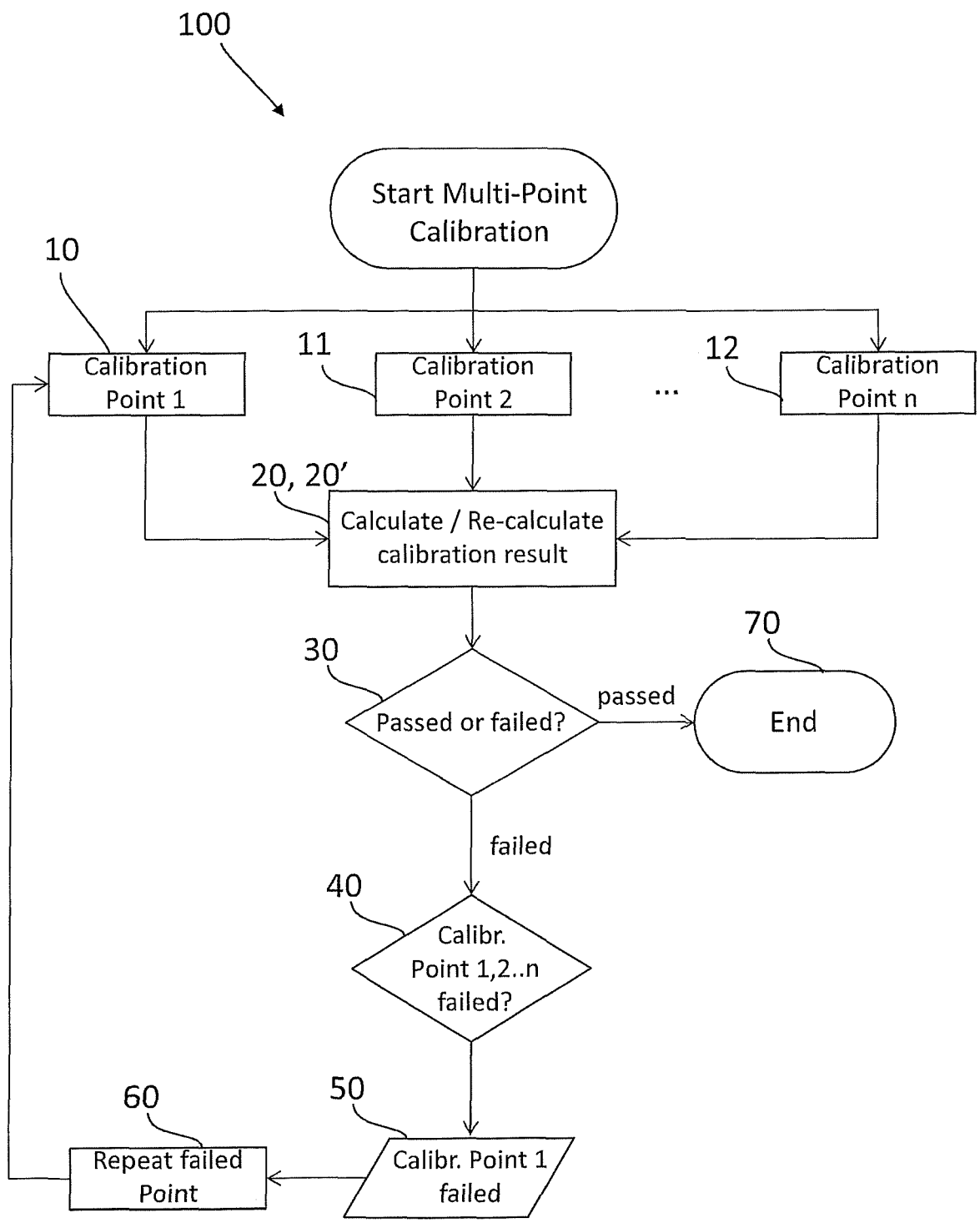
FIG. 1 illustrates a flow chart depicting a method of calibrating an in-vitro diagnostic analyzer according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A computer-implemented method of calibrating an in-vitro diagnostic analyzer is herein introduced that can enable minimization of the time spent for calibration procedures, of delays of routine operation due to missing calibration, and of the use of calibrators, thereby also saving costs and preventing waste of often expensive materials.

Another advantage of this method is that it can enable the discrimination of systematic errors from random errors and, in several cases, the determination of the cause of a failed calibration procedure.

In some cases, another advantage of this method can be that it can enable the trigger of additional actions that facilitate troubleshooting, reduce maintenance and service costs, accelerate complain handling and minimize further instrument down times.

The method of calibrating an in-vitro diagnostic analyzer can comprise executing a multi-point calibration procedure comprising measuring a plurality of calibrator levels and thereby obtaining a plurality of respective calibration points, calculating a result of the multi-point calibration procedure and determining failure or passing of the multi-point calibration procedure based on the calculated result. In the case of failure of the multi-point calibration procedure, the method can comprises determining if failure is related to one or more individual failed calibration point(s) and, in the affirmative, triggering a repetition of measuring the calibrator level(s) only with respect to the failed calibration point(s) and re-calculating the result of the multi-point calibration procedure after replacing only the failed calibration point(s) with the newly obtained calibration point(s).

An "in-vitro diagnostics analyzer" can be a laboratory automated apparatus dedicated to the analysis of samples for in vitro diagnostics. The in-vitro diagnostics analyzer may have different configurations according to the need and/or according to the desired laboratory workflow. Additional configurations may be obtained by coupling a plurality of apparatuses and/or modules together. A "module" can be a work cell, typically smaller in size than the entire clinical diagnostics system, which can have a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g. by performing one or more pre-analytical and/or analytical and/or post-analytical steps. Thus the in-vitro diagnostics analyzer may comprise one analytical apparatus or a combination of any of such analytical apparatuses with respective workflows, where pre-analytical and/or post analytical modules may be coupled to individual analytical apparatuses or be shared by a plurality of analytical apparatuses. Alternatively, pre-analytical and/or post-analytical functions may be performed by units integrated in an analytical apparatus. The in-vitro diagnostics analyzer can comprise functional units such as liquid handling units for pipetting and/or pumping and/or mixing of samples and/or reagents and/or system fluids, and also functional units for sorting, storing, transporting, identifying, separating, detecting. Examples of in-vitro diagnostic analyzers can include clinical chemistry analyzers, immunochemistry analyzers, coagulation analyzers, hematology analyzers, molecular diagnostic analyzers and the like. The list is not exhaustive.

The term "sample" can refer to a biological material suspected of containing one or more analytes of interest and whose detection, qualitative and/or quantitative, may be associated to a clinical condition. The sample can be derived from any biological source, such as a physiological fluid, including blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g. after adding an internal standard, after being diluted with another solution or after having being mixed with reagents e.g. to enable carrying out one or more in vitro diagnostic tests, or for enriching (extracting/separating/concentrating) analytes of interest and/or for removing matrix components potentially interfering with the detection of the analyte(s) of interest.

A "calibrator" can be a calibration solution that contains known values of one or more calibration materials used for calibration and that can be measured under the same conditions as a sample, typically including the use of reagents. Calibrators can be provided in different levels that correspond to different concentration ranges of the calibration materials, including zero concentration, i.e. a blank solution. Typically, one or two levels of the same calibrator can be used for a one-point or two-point calibration respectively, in case of linear response to analyte concentrations. Three or more calibrator levels, e.g. up to five, six or more levels may be used if the calibration curve is non-linear.

A "calibration material" can be an analyte identical to an analyte of interest, the concentration of which is known, or that generates by reaction or derivatization, e.g., by fragmentation, an analyte identical to an analyte of interest, the concentration of which is known, or it can be any other equivalent substance of known concentration, which mimics the analyte of interest or that can be otherwise correlated to a certain analyte of interest.

A "reagent" can be a substance used for treatment of a sample or a calibrator in order e.g., to prepare a sample for analysis or a calibrator for measurement, in order to enable a reaction to occur, or to enable detection of a physical parameter of the sample calibrator or analyte contained in the sample or calibrator. In particular, a reagent can be a substance that can be or can comprise a reactant, typically a compound or agent capable e.g., of binding to or chemically transforming one or more analytes or an unwanted matrix component. Examples of reactants are enzymes, enzyme substrates, conjugated dyes, protein-binding molecules, ligands, nucleic acid binding molecules, antibodies, chelating agents, promoters, inhibitors, epitopes, antigens, and the like. However, the term reagent can be used to include any fluid that can be added to a sample or calibrator including a dilution liquid, including water or other solvent or a buffer solution, or a substance that can be used for disruption of specific or nonspecific binding of an analyte to a protein, binding proteins or surfaces.

Samples may be provided, for example, in sample containers such as sample tubes, including primary tubes and secondary tubes, or multi-well plates, or any other sample carrying support, open or closed. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

A "calibration procedure" can be a process that can enable the correlation of a measured sample signal with a quantitative result of analyte concentration in a sample by measuring known values of calibration materials present in calibrators under the same conditions of the measured sample, including the same workflow and eventually the use of the same reagent(s). Depending of the type of signal and especially linearity or non-linearity of the signal at different concentrations, which may vary depending on the particular sample, particular analyte(s) of interest, on the particular workflow and measuring conditions, the calibration procedure may comprise measuring one or more levels of calibrators corresponding to different concentration ranges of the calibration materials that fall in the range of detection of the analyzer (dynamic range) and/or the typical range of concentrations of analytes that can be found in a sample. When only one calibrator level is measured, the calibration procedure can be a one-point calibration procedure. When two levels of calibrator are measured, the calibration procedure can be a two-point calibration procedure and so on. A "multi-point calibration procedure" can be a calibration procedure that can comprise measuring a plurality of calibrator levels, i.e., at least two and typically three or more, and, in particular, measuring a respective calibrator level for each of a plurality of calibration points, thereby obtaining a plurality of respective calibration points.

Depending on the particular sample, on the particular analyte(s) of interest, on the particular workflow, including sample/reagent(s) combination and measuring conditions, different calibration procedures may have to be executed, each possibly including a different calibrator or calibrators and eventually different levels of calibrators and/or a different number of levels.

"Calculating the result of the multi-point calibration procedure" can be the process of constructing a curve, or mathematical function, that can have the best fit to the measured calibration points and including a regression analysis that can take into account statistical inference such as how much uncertainty is present in the constructed curve because of measurement errors due to unknown and/or random errors occurred in the process, by calculating the amount of variation or dispersion of the measured calibration points (standard deviation). The process may comprise comparing the constructed curve to a reference curve or previously constructed curves under the same conditions and/or comparing individual calibration points to reference values or previously measured values.

"Determining failure or passing" of the multi-point calibration procedure based on the calculated result can be the process of quantifying the measurement error and determining whether the error is smaller than a requirement threshold value according to a specification of the analyzer. In particular, failure of the multi-point calibration procedure can be determined when the error is greater than the requirement threshold value, whereas passing or release of the multi-point calibration procedure can be determined when the error is smaller than the requirement threshold value.

In the case of failure of the multi-point calibration procedure, the method of the present disclosure can comprise determining if the failure is related to one or more individual failed calibration point(s) by quantifying the measurement error for each of the individual calibration points. In the case that it is determined that failure is related to one or more individual failed calibration point(s), the method can comprise triggering a repetition of measuring, i.e., repeating the measurement, of the calibrator level corresponding to the failed calibration point(s) only and re-calculating the result of the multi-point calibration procedure after replacing only the failed calibration point(s) with the newly obtained calibration point(s) while retaining all other non-failed or passed (released) calibration points.

The term "trigger" or "triggering" can be herein used to intend either an automatic procedure that can be initiated and executed by the in-vitro diagnostic analyzer automatically or a warning generated by the in-vitro diagnostic analyzer and prompting a user to manually intervene or a semiautomatic procedure as a combination of both.

According to an embodiment, the multi-point calibration procedure and/or repetition of measuring the calibrator level with respect to the failed calibration point(s) can comprise measuring the respective calibrator level for each calibration point in duplicate in order to obtain a pair of measurement data (raw result data) for each calibration point.

According to an embodiment, determining if failure is related to one or more individual failed calibration point(s) can comprise comparing a deviation of each calibration point or average value between duplicate measurement data of each calibration point respectively from a fitted multi-point calibration curve.

According to an embodiment, determining if failure is related to one or more individual failed calibration point(s) can comprise comparing the duplicate measurement data of each calibration point respectively and determining if their difference in value exceeds a predetermined threshold. It can happen for example that although the difference between two measurement data is substantial, the mean value can still be within the tolerance range defined by the threshold value for a calibration to fail. By comparing the duplicate measurement data within each pair, it can be determined if an error occurred as it is likely that in the case of a random error, the two measurement data can substantially differ from each other.

According to an embodiment, determining if failure is related to one or more individual failed calibration point(s) can comprise comparing reaction curves associated to the duplicate measurement data of each calibration point respectively and determining if the reaction curves substantially differ from each other. In particular, sample measurement may comprise in some cases, e.g., in coagulation analysis, monitoring of a reaction curve in order to determine e.g., a time of reaction or other changing parameter which can be indicative of an analyte concentration or characteristic of the sample. An anomalous shape of the reaction curve may be indicative of an error occurred in the workflow or during measurement, e.g., presence of interferences in the optical path, such as air, debris, dust and the like. By comparing the reaction curves of duplicate measurements of each calibration point respectively, it can be also determined if an error occurred, since it is likely that in case of a random error, the error can occur only in one out of two measurements.

According to an embodiment, determining if failure is related to one or more individual failed calibration point(s) can comprise assessing one or more predetermined operational parameters of the in-vitro diagnostic analyzer that can be associated with the failure of the failed calibration point(s).

According to an embodiment, the method can comprise comparing the one or more predetermined operational parameters in relation to the execution of the duplicate measurements for each calibration point respectively.

An "operational parameter" can be a measurable property, or a property derivable from raw data, including any sort of distinguishable physical and/or chemical signal, that can be detected and quantified during operation of the in-vitro diagnostic analyzer, and, in particular, during execution of the multi-point calibration procedure such as but not limited to electrical current, voltage, electrical resistance, electrical capacitance, magnetic field, time, distance, size, shape, area, volume, height, velocity, position, temperature, pressure, viscosity, pH, surface properties, chemical and/or biological properties, mechanical resistance, light intensity, wavelength, frequency, noise, and the like. The term "raw data" that may be also called "source data" can be data that has not been processed for use but has the potential to become information by selective extraction, organization, and sometimes analysis and formatting for presentation. Once processed, the data can become an operational parameter. In particular, one or a set of operational parameters can be selected that if monitored can be indicative of the performance status of the in-vitro diagnostic analyzer in general and in particular of any functional (operational) units involved in the execution of the calibration procedure, e.g., pipetting unit(s), detection unit and the like.

The "monitoring" of the operational parameter(s) may be continuous or at intervals and may occur simultaneously or at different or at overlapping times depending on the particular parameters and actual operational status. In particular, not all operational parameters of a set of operational parameters may need to be monitored at the same time and at any given time. For example, monitoring of some operational parameters may occur only when some functional units are active. In particular, monitoring of at least some operational parameters may be paused and resumed or simply ignored on the particular actual operational status.

The term "performance status" can refer to the ability of the in-vitro diagnostic analyzer to achieve its intended purpose as specified by the manufacturer and to ensure analytical performance, i.e., the ability to correctly detect and/or measure analytes of interest. Thus, the term "indicative of the performance status" with reference to the set of operational parameters can mean determining or at least contributing to determine (indicating) whether the in-vitro diagnostic analyzer is performing or non-performing according to specification.

Therefore, assessing one or more predetermined operational parameters of the in-vitro diagnostic analyzer in connection to a multi-point calibration procedure can comprise checking if the predetermined operational parameter(s) are out of specification during execution of the multi-point calibration procedure and, in particular, during measurement of a calibrator level with respect to an individual calibration point or duplicate measurement for the same calibration point.

By executing duplicate measurements for each calibration point and comparing the one or more predetermined operational parameters in relation to the execution of the duplicate measurements respectively, it may help to determine if failure is due to a random error in handling a calibrator or to a systematic error of the in-vitro diagnostic analyzer. For example, when the operational parameter is temperature, it can be possible that a temperature sensor of a pipetting nozzle that is supposed to warm up an aliquot of calibrator analogously to a sample to a predetermined temperature when aspirated can indicate that the predetermined temperature has not been reached. One possible reason of systematic error, if it repeatedly occurs, may be that a nozzle heater or the temperature sensor is damaged. One possible reason of random error, if it occurs only once or a few times, can be that the calibrator may have been recently taken out of a refrigerator and may therefore still be too cold for the predetermined temperature to be reached within the available time. By the time the second measurement for the same calibration point is taken, the temperature of the calibrator may have increased.

The term "substantially different" or "substantial difference" can be herein used to include any deviation from a reference value, quantity, measure, shape, that falls outside of a predetermined tolerance range, e.g. more than 2 or 3 standard deviations (SD).

According to an embodiment, triggering a repetition of measuring the calibrator level only with respect to the failed calibration point(s) can comprise indicating possibly failed calibration point(s) to be repeated and requesting user confirmation of the indicated calibration point(s).

According to an embodiment, if it cannot be automatically determined that failure of the multi-point calibration procedure is related to one or more individual failed calibration point(s), the method can further comprise requesting user selection of the failed calibration point(s), triggering the repetition of measuring the calibrator level only with respect to the selected calibration point(s) and re-calculating the result of the multi-point calibration procedure after replacing only the selected calibration point(s) with the newly obtained calibration point(s).

According to an embodiment, the method can further comprise setting a time limit for user confirmation or user selection and, if the time limit is exceeded, triggering a repetition of the entire multi-point calibration procedure. In particular, the time limit may not exceed the time interval between two regularly scheduled multi-point calibration procedures or a pre-determined expiration time of a calibration procedure, which may count from the time when in a multi-point calibration procedure at least one calibration point passed. In this way, it can be prevented that a user purposely executes only partial calibration procedures by repeating only individual calibration points.

According to an embodiment, the method can further comprise flagging the re-calculated calibration result of the multi-point calibration procedure if repetition of measuring the calibrator level only for the failed calibration point(s) is automatically triggered in order to enable later user verification.

The method may comprise repeating the entire multi-point calibration procedure if more than one or more than two or more than 50% of the calibration points failed.

According to an embodiment, the method can comprise displaying the calculated result of the multi-point calibration procedure and/or of the re-calculated result of the multi-point calibration procedure after replacing only the failed calibration point(s), where displaying may comprise plotting the calibration points and/or the calibration curve and/or listing the measurement data for each calibration point, e.g., in a table format. The method may further comprise directly comparing the two results, e.g., by superimposing or displaying on the same screen or by alternating views, the first calculated result and the re-calculated result, before and after replacing the failed calibration point(s).

Displaying may comprise plotting and/or listing the duplicate measurement data for each calibration point.

Displaying may comprise indicating failed or possibly failed calibrations point(s) and/or repeated calibration points.

Displaying may comprise displaying selection areas for selecting and/or confirming failed calibration point(s). A user may for example confirm or recognize failed calibration points by looking at the plotted calibration points and/or duplicate measurement data and select any of the calibration points to be repeated by directly clicking or touching on the display directly on the plotted calibration point(s) or in a list table. A specific display button may be also provided in order to confirm selection and start repetition for the selected calibration point(s).

The in-vitro diagnostic analyzer may comprise or be connected to a controller. The term "controller" can encompass any physical or virtual processing device and, in particular, a programmable logic computer running a computer-readable program provided with instructions to perform operations in accordance with an operation plan and, in particular, associated with the execution of multi-point calibration procedures and repetition of failed calibration points. The controller may be part of the in-vitro diagnostic analyzer or be a separate logic entity in communication with the in-vitro diagnostic analyzer. In some embodiments, the controller may be integral with a data management unit, may be comprised by a server computer and/or be distributed across a plurality of in-vitro diagnostic analyzers. The controller may be also configurable to control the in-vitro diagnostic analyzer in a way that workflow(s) and workflow step(s) can be conducted by the in-vitro diagnostic analyzer. In particular, the controller may communicate and/or cooperate with a scheduler and/or data manager in order to take into account incoming analysis orders and/or received analysis orders and a plurality of scheduled process operations associated with the execution of the analysis orders in order to plan when a multi-point calibration procedure and/or repletion of failed calibration point(s) is to be executed.

The present disclosure can, thus, also be directed to an in-vitro diagnostic analyzer comprising a controller configured to execute a multi-point calibration procedure comprising measuring a plurality of calibrator levels and thereby obtaining a plurality of respective calibration points, calculating a result of the multi-point calibration procedure and determining failure or passing of the multi-point calibration procedure based on the calculated result. In the case of failure of the multi-point calibration procedure, the controller can be further configured to determine if failure is related to one or more individual failed calibration point(s), and in the affirmative to trigger a repetition of measuring the calibrator level(s) only with respect to the failed calibration point(s) and re-calculate the result of the multi-point calibration procedure after replacing only the failed calibration point(s) with the newly obtained calibration point(s).

The controller may be further configured to execute any of the method steps according to any of the above described embodiments.

The controller may be configured to trigger also a maintenance procedure when failure of a multi-point calibration procedure and or failure of a calibration point is determined.

A "maintenance procedure" can be a procedure intended to investigate a root cause of a technical issue responsible for an operational parameter to be out of specification and/or to resolve an identified technical issue that can be the cause of a systematic error and/or a preventive measure intended to prevent that a technical issue occurs. The maintenance procedure may comprise actions such as checking, adjusting, correcting, cleaning, repairing, replacing, and the like.

The term "according to specification" or "within specification" can refer to a range or a threshold specified by the manufacturer that can have a measurable value and within which or below or above which an operational parameter is supposed to be in order for the clinical diagnostic system to achieve its intended purpose and to ensure analytical performance. This may include also a tolerance range within which, although the operational parameter is out of specification, it can be considered still acceptable. The specification range or threshold and eventual tolerance ranges may be different for different operational parameters and also the measurement units may be different.

The term "out of specification" can have the opposite meaning of the term "within specification".

The controller may be further configured to prevent queueing up samples, for which an analysis order has been received but processing has not yet started, from entering the in-vitro diagnostic analyzer and/or from starting the sample analysis workflow until the multi-point calibration procedure is passed.

In this way, unnecessary consumption of samples and consumables, including reagents, can be prevented, generation of erroneous results can be prevented, delay of routine operation due to missing calibration can be reduced, damages of the system or system modules can be prevented, and safety of operation can be increased.

The present disclosure is also directed to a user interface configured to display the calculated result of the multi-point calibration procedure and/or of the re-calculated result of the multi-point calibration procedure after replacing only the failed calibration point(s) and optionally to directly compare the two results.

According to an embodiment, the user interface can be further configured to list and/or plot duplicate measurement data for each calibration point.

According to an embodiment, the user interface can be further configured to indicate failed or possibly failed calibrations point(s) and/or repeated calibration points.

According to an embodiment, the user interface can be further configured to display selection areas for selecting and/or confirming failed calibration point(s).

Referring initially to FIG. 1, FIG. 1 illustrates a method of calibrating an in-vitro diagnostic analyzer. The method can comprise executing a multi-point calibration procedure 100 comprising measuring a plurality of calibrator levels 10, 11, 12 thereby obtaining a plurality of respective calibration points 1-*n*, calculating a result 20 of the multi-point calibration procedure 100 and determining failure or passing 30 of the multi-point calibration procedure 100 based on the calculated result 20. In case of failure of the multi-point calibration procedure 100, the method comprises determining 40 if failure is related to one or more individual failed calibration points 1-*n*, and in the affirmative 50 triggering a repetition 60 of measuring the calibrator level 10 only for the failed calibration point(s) 1 and re-calculating the result 20' of the multi-point calibration procedure 100 after replacing only the failed calibration point 1 with the newly obtained calibration point 1. Repetition 60 of the procedure only for the failed calibration point(s) 1 can comprise repeating measurement of the calibration level 10 with respect to the failed calibration point 1. In the case of passing of the multi-point calibration procedure 100, the procedure can be ended 70. Failure of calibration point 1 is shown as example. It is easy to imagine other examples with any other calibration point(s) 2-*n*.

Figure 2:
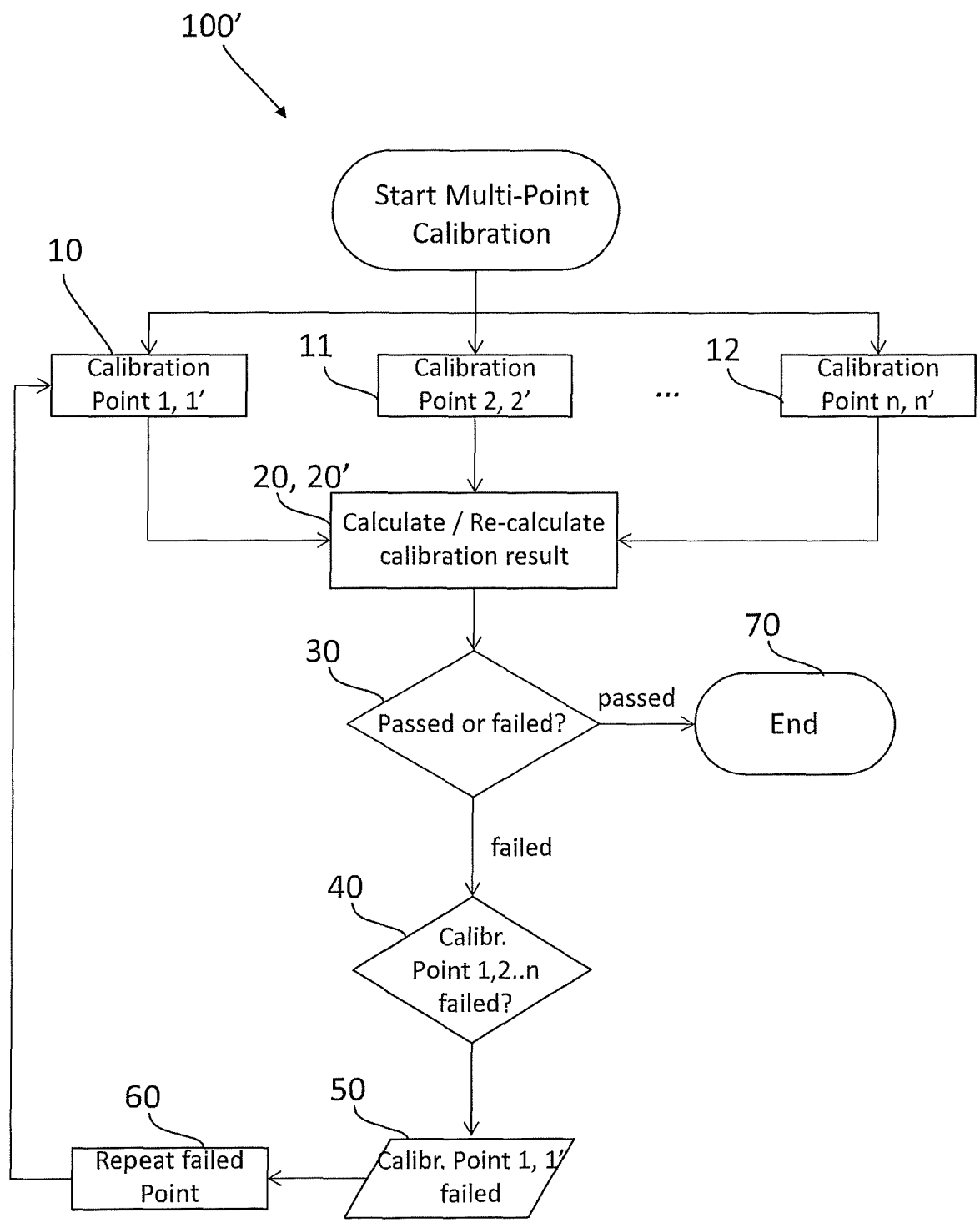
FIG. 2 illustrates a variant of the method of FIG. 1 according to an embodiment of the present disclosure.

FIG. 2 is a multi-point calibration procedure 100' that is variant of the multi-point calibration procedure 100 of FIG. 1. The difference between the multi-point calibration procedure 100' of FIG. 2 and the multi-point calibration procedure 100 of FIG. 1 is that the method can comprise measuring the respective calibrator level 10, 11, 12 for each calibration point 1-n in duplicate in order to obtain a pair of measurement data 1, 1', 2, 2'-n, n' for each calibration point 1-n. When repeating the procedure 60 for the failed calibration point(s) 1, the respective calibrator level 10 can again be measured in duplicate 1, 1'.

Figure 3:
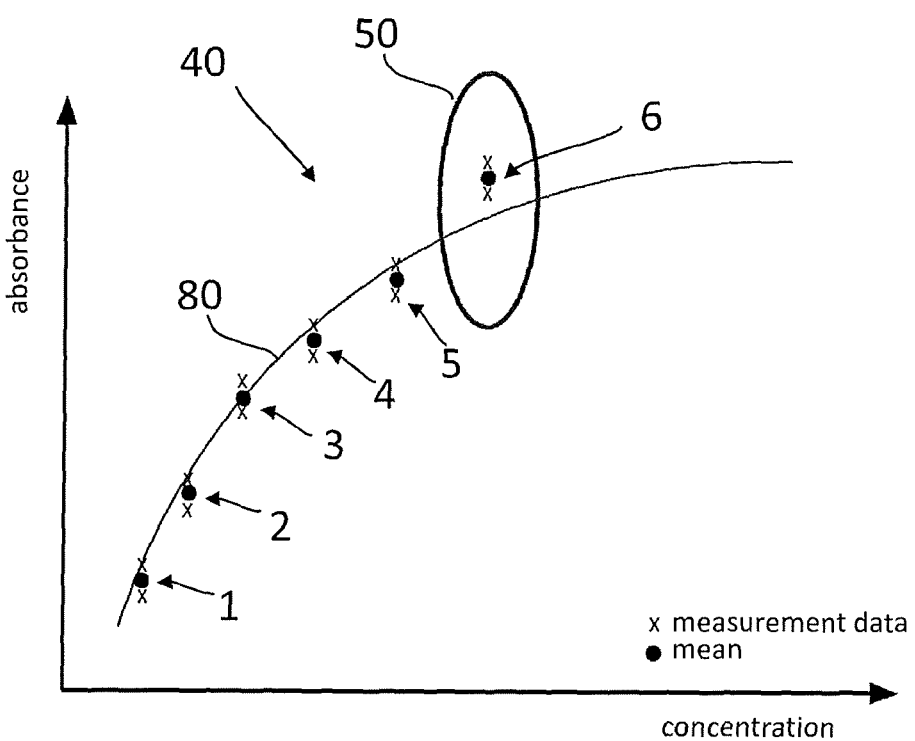
FIG. 3 illustrates an example of how failure in a calibration procedure can be determined according to an embodiment of the present disclosure.

FIG. 3 shows an example of how failure in a calibration procedure 100, 100' according to FIG. 1 or FIG. 2 can be determined. In the graph of FIG. 3, the values (absorbance vs concentration) of six calibration points 1-6, corresponding to six calibrator levels measured in duplicate (two measurement data for each calibration point 1-6), are plotted. The step 40 of determining if failure is related to one or more individual failed calibration points 1-6 can comprise comparing a deviation of each calibration point 1-6 or average (mean) value between duplicate measurement data for each calibration point 1-6 from a fitted multi-point calibration curve 80. In this case, it can be determined 50 that failure can be related to failure of calibration point 6.

Figure 4:
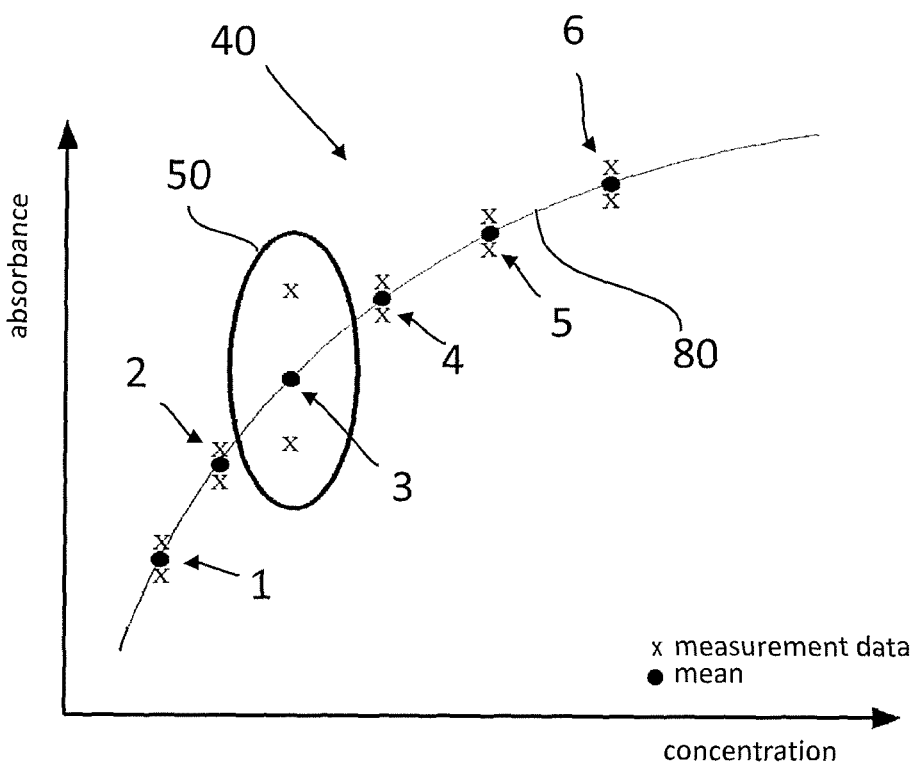
FIG. 4 illustrates another example of how failure in a calibration procedure can be determined according to an embodiment of the present disclosure.

FIG. 4 shows another example of how failure in the calibration procedure 100' according FIG. 2 can be determined. In the graph of FIG. 4, the values (absorbance vs concentration) of six calibration points 1-6, corresponding to six calibrator levels measured in duplicate, are plotted. The fitted multi-point calibration curve 80 is also plotted. The step 40 of determining if failure can be related to one or more individual failed calibration points 1-6 comprises comparing the duplicate measurement data of each calibration point 1-6 respectively and determining if their difference in value exceeds a predetermined threshold. In this case, it can be determined 50 that failure can be related to failure of calibration point 3. In this example, it can be seen that the mean value between the two measurement data for calibration point 3 is accidentally fitting to the calibration curve 80. Thus, by determining only deviation of the mean value for calibration point 3 from the fitted curve, failure of the calibration point 3 can remain unnoticed.

Figure 5:
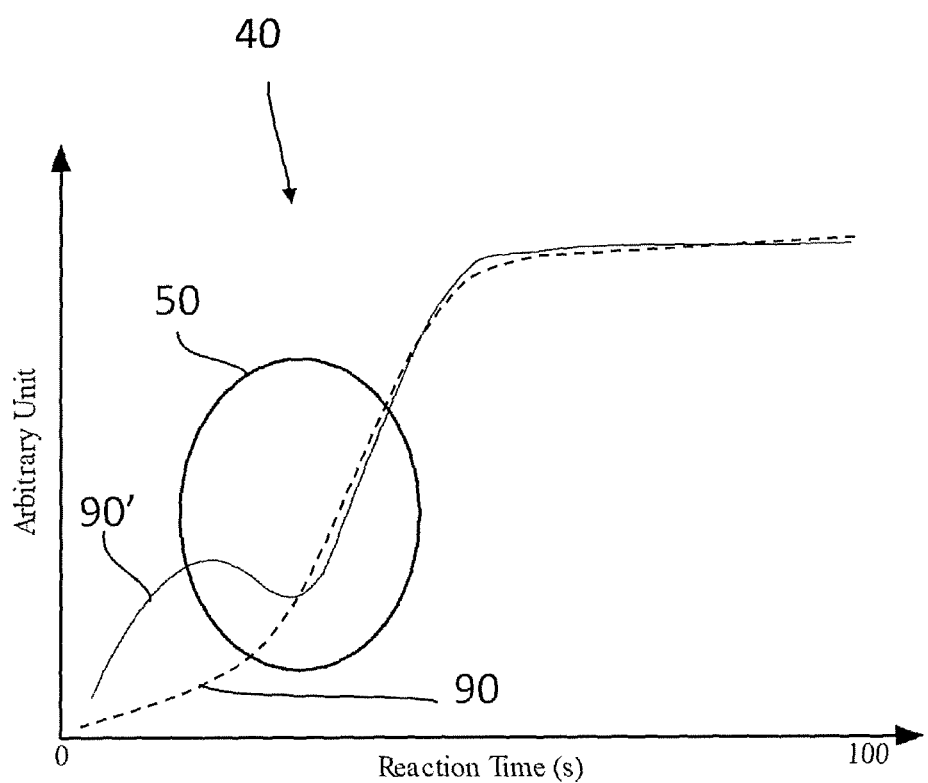
FIG. 5 illustrates another example of how failure in a calibration procedure can be determined according to an embodiment of the present disclosure.

FIG. 5 shows another example of how failure in the calibration procedure 100' according to FIG. 2 can be determined. In the graph of FIG. 5, the reaction curves 90, 90' associated to the duplicate measurement data for one calibration point out of a plurality of calibration points belonging to the same multi-point calibration procedure 100' are displayed (arbitrary unit, e.g. absorbance vs reaction time in seconds). In particular, the step 40 of determining if failure is related to one or more individual failed calibration points can comprise comparing the reaction curves 90, 90' associated to the duplicate measurement data for each calibration point respectively (only for one calibration point shown in this example) and determining if the reaction curves 90, 90' substantially differ from each other. In this case, it can be determined 50 that for one of the calibration points the reaction curves 90, 90' substantially differ from each other. In particular, one of the reaction curves 90 is normal, i.e. shows a pattern similar to a reference pattern, whereas the second reaction curve 90' is abnormal, i.e. it deviates from a reference pattern. Thus, it can be determined that failure of the multi-point calibration procedure 100' can be related to failure of this particular calibration point.

Figure 6:
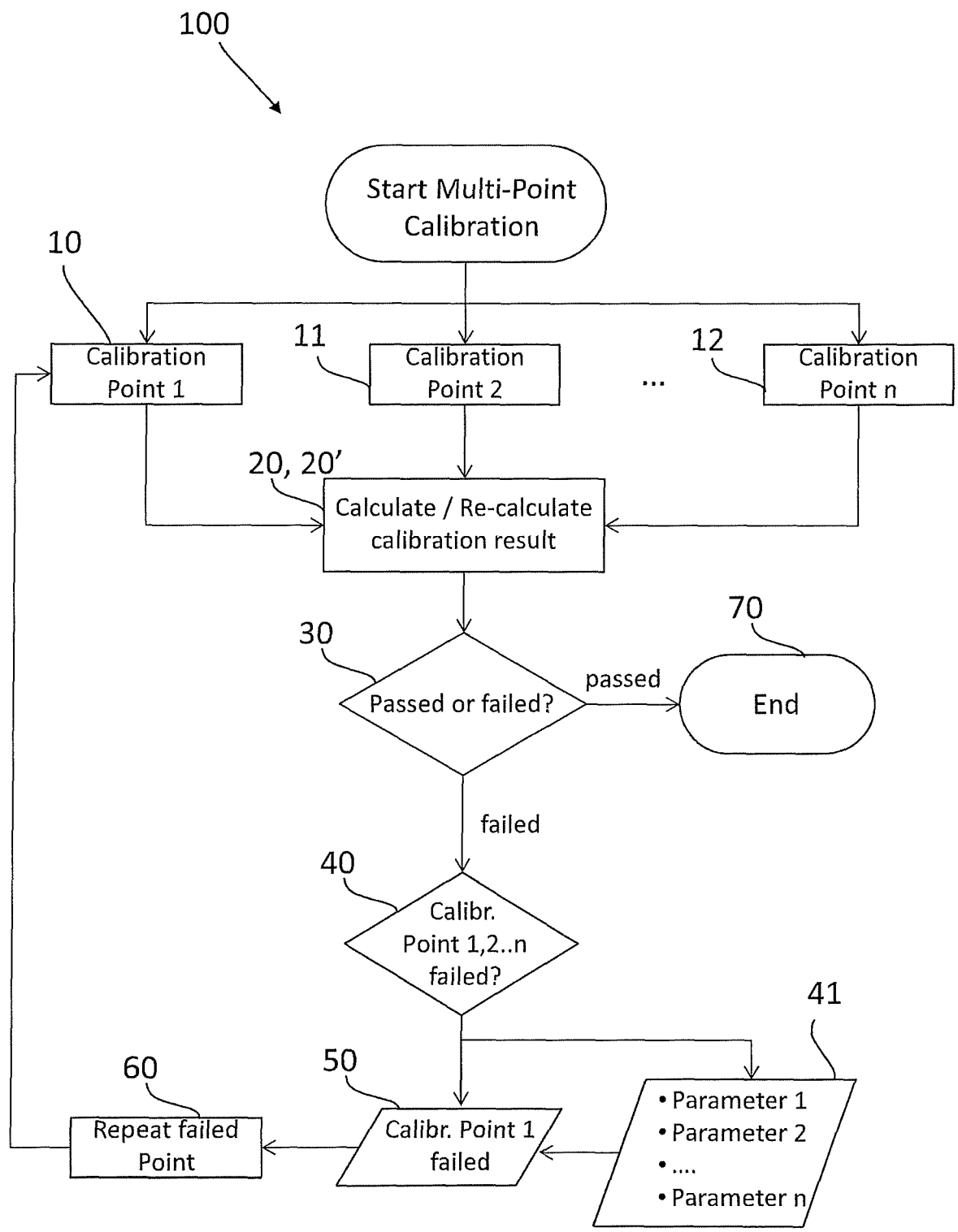
FIG. 6 illustrates another example of how failure in a calibration procedure can be determined according to an embodiment of the present disclosure.

FIG. 6 shows another example of how failure in a calibration procedure 100 according to FIG. 1 can be determined. In particular, FIG. 6 is identical to FIG. 1 with the exception that the step 40 of determining if failure is related to one or more individual failed calibration point(s) 1-n can comprise the step 41 of assessing one or more predetermined operational parameters 1-n of the in-vitro diagnostic analyzer that can be associated with the failure of the failed calibration point(s) 1-n. In this example, it can be determined 50 that calibration point 1 has failed based on the assessment 41 of the operational parameters 1-n.

Figure 7:
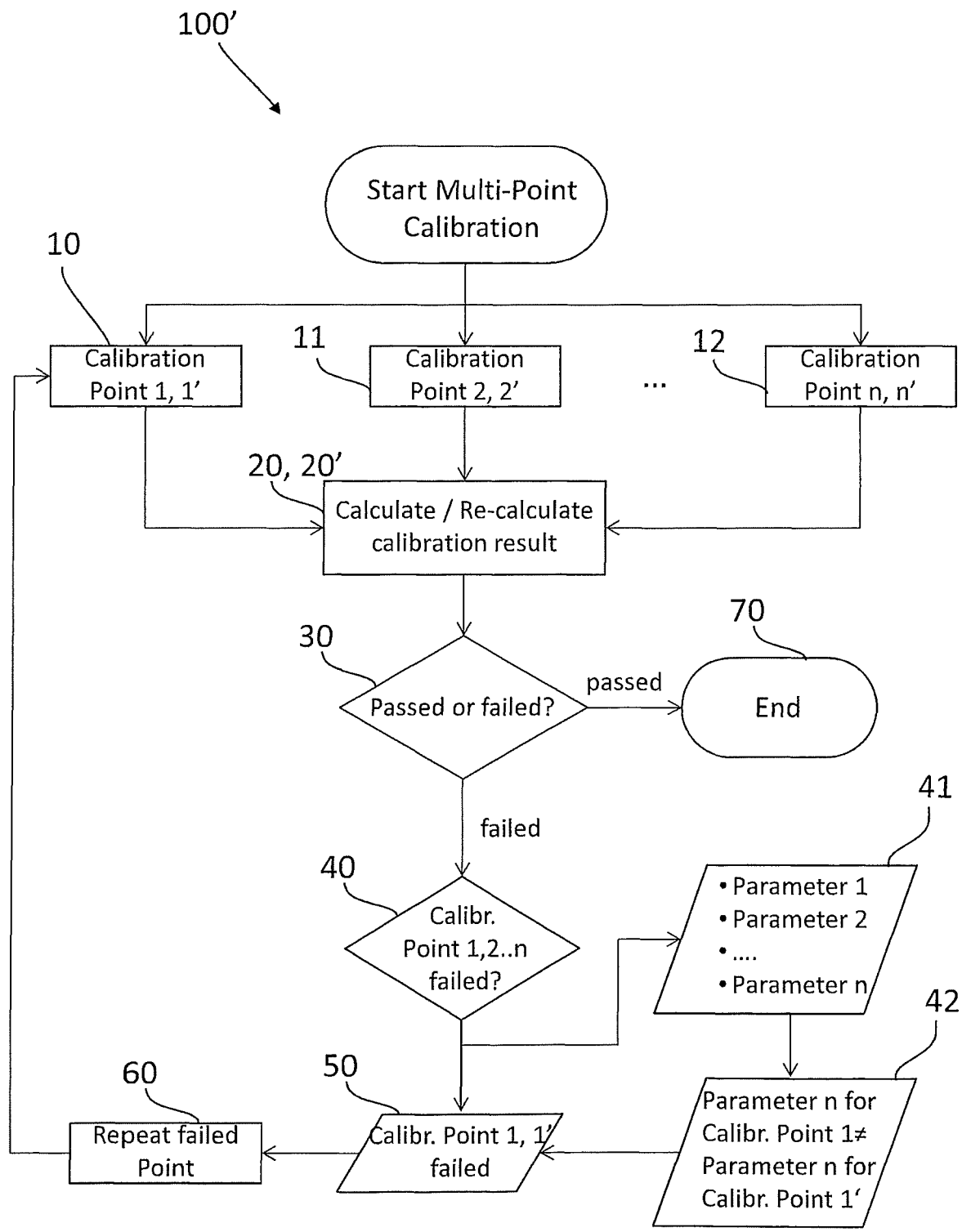
FIG. 7 illustrates another example of how failure in a calibration procedure can be determined according to an embodiment of the present disclosure.

FIG. 7 shows another example of how failure in a calibration procedure 100' according to FIG. 2 can be determined. In particular, FIG. 7 is identical to FIG. 2 with the exception that the step 40 of determining if failure is related to one or more individual failed calibration point(s) 1-n can comprise the step 41 of assessing one or more predetermined operational parameters 1-n of the in-vitro diagnostic analyzer that can be associated with the failure of the failed calibration point(s) 1-n and it can further comprise the step 42 of comparing the one or more predetermined operational parameters 1-n in relation to the execution of the duplicate measurements for each calibration point 1-n respectively. In this example, it can be determined 50 that calibration point 1 has failed because, based on the assessment 41 of operational parameters 1-n, it can be determined 42 that the value of the operational parameter n for calibration point 1 is different from the value of the operational parameter n for calibration point 1'.

Figure 8:
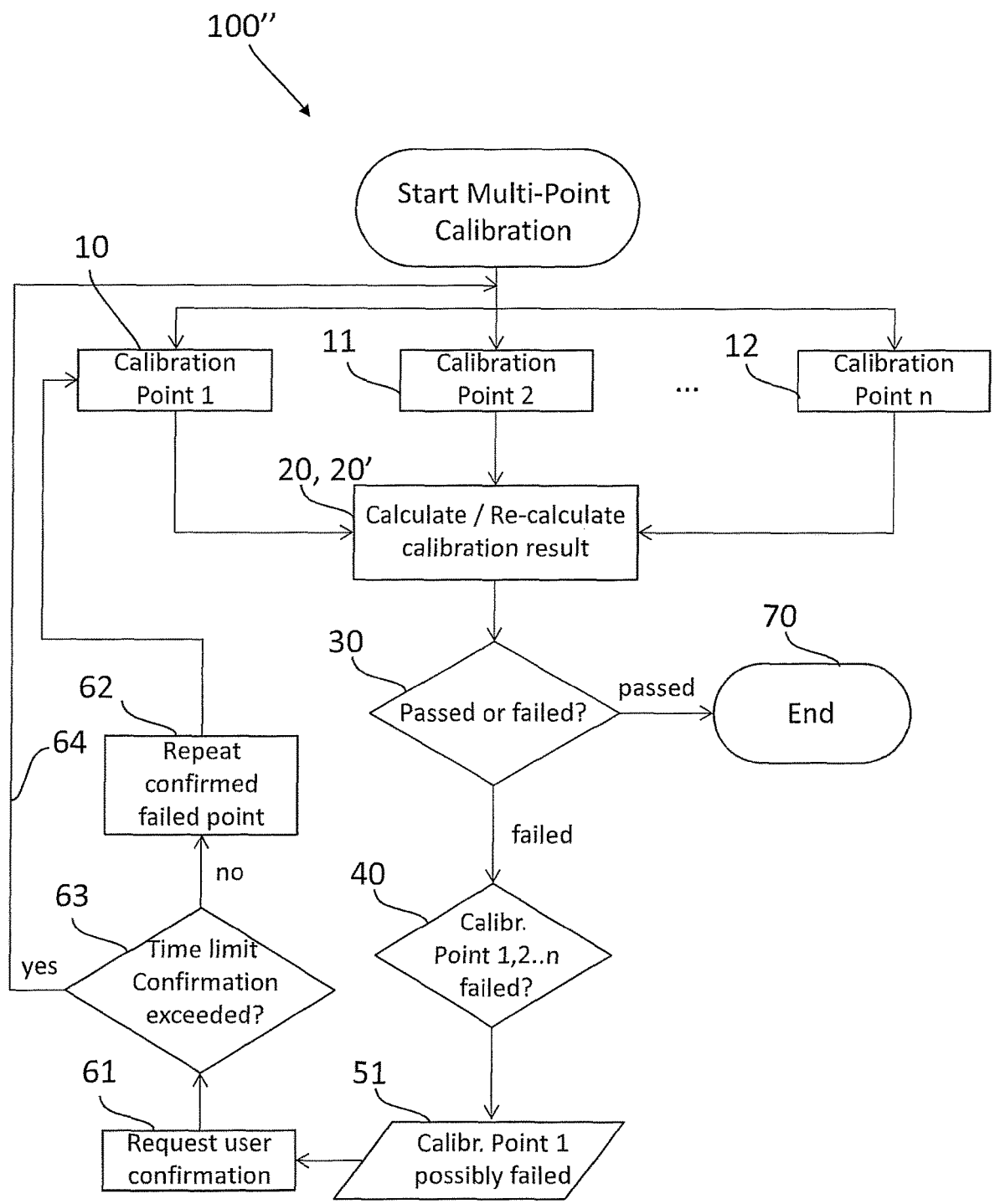
FIG. 8 illustrates a variant of the method of FIG. 1 according to an embodiment of the present disclosure.

FIG. 8 shows a multi-point calibration procedure 100" that is another variant of the multi-point calibration procedure 100 of FIG. 1. Only the difference with respect to FIG. 1 will be described. In particular, the multi-point calibration procedure 100" can comprise indicating 51 possibly failed calibration point(s) 1-n to be repeated and requesting user confirmation 61 of the indicated possible failed calibration point 1 before repeating 62 measurement of the calibrator level 10 for the confirmed failed calibration point 1. In this example, the multi-point calibration procedure 100" can further comprise setting a time limit 63 for user confirmation and if the time limit is exceeded, triggering a repetition 64 of the entire multi-point calibration procedure 100".

Figure 9:
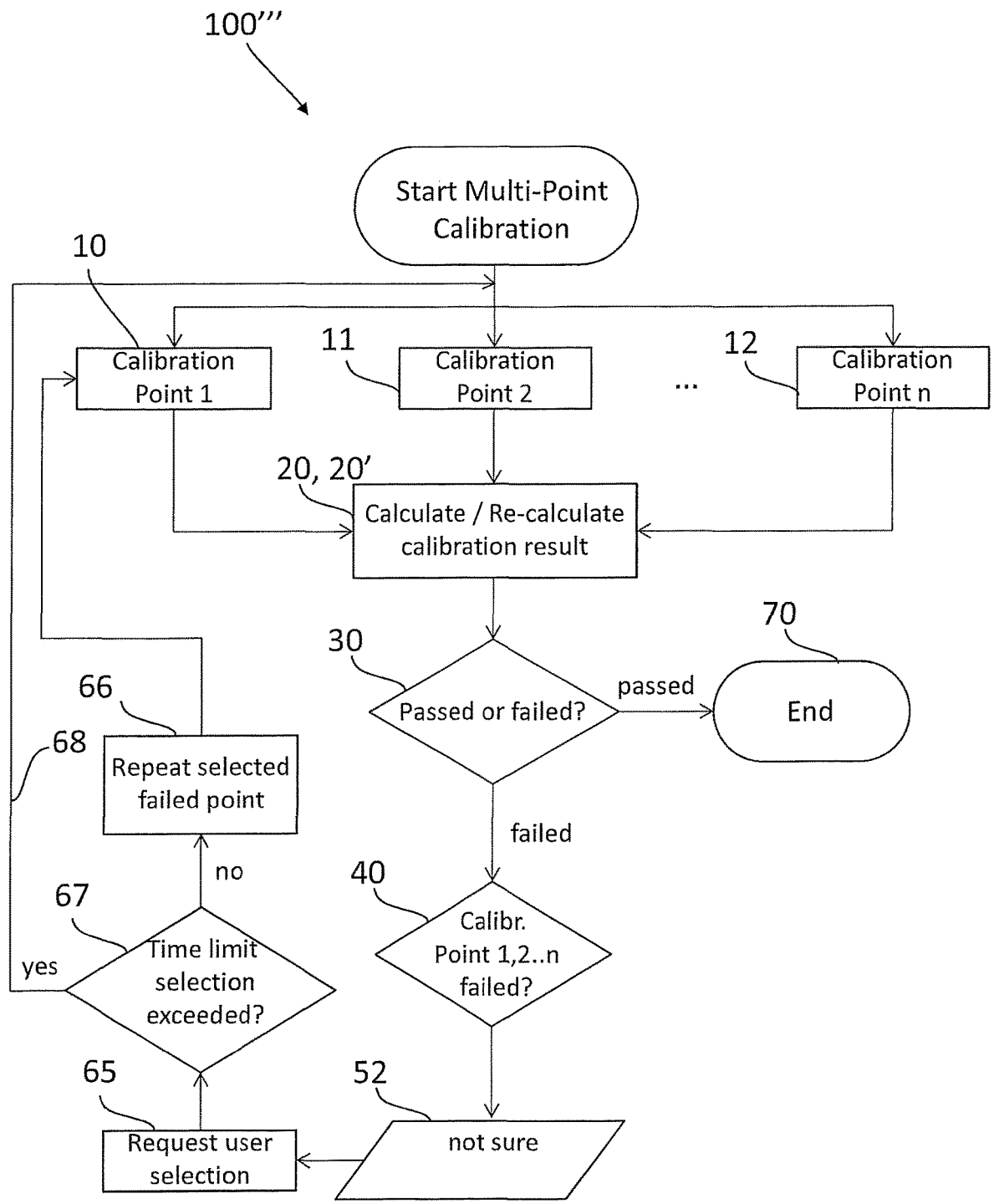
FIG. 9 illustrates a variant of the method of FIG. 1 according to an embodiment of the present disclosure.

FIG. 9 shows a multi-point calibration procedure 100''' that is another variant of the multi-point calibration procedure 100 of FIG. 1. Only the difference with respect to FIG. 1 will be described. In particular, if it cannot be automatically determined 52 that failure of the multi-point calibration procedure 100''' is related to one or more individual failed calibration point(s) 1-n, the multi-point calibration procedure 100''' can comprise requesting user selection 65 of the failed calibration point(s) 1-n, before repeating 66 measurement of the calibrator level 10 for the selected failed calibration point 1. In this example, the multi-point calibration procedure 100''' can further comprise setting a time limit 67 for user selection and if the time limit is exceeded, triggering a repetition 68 of the entire multi-point calibration procedure 100'''.

Figure 10:
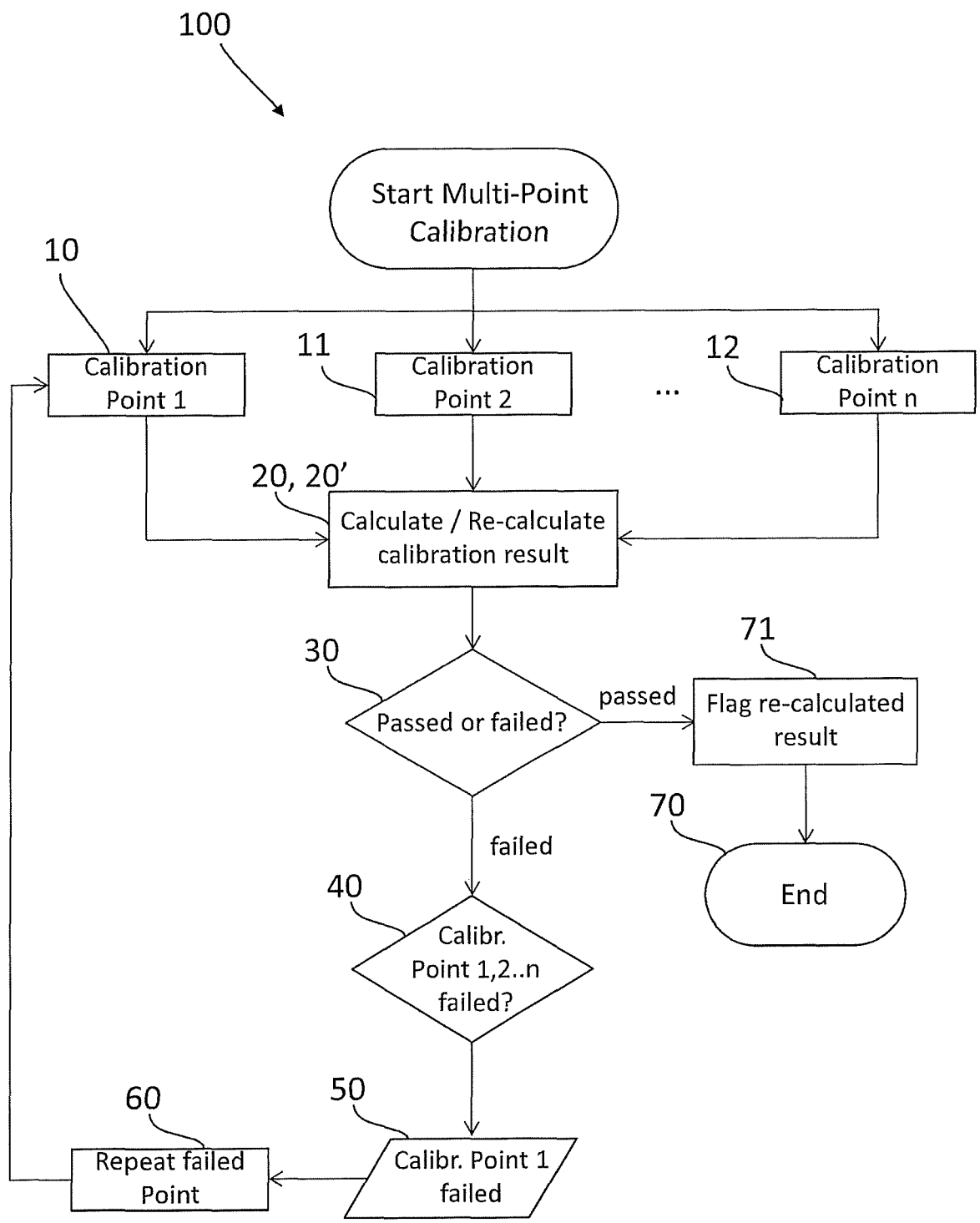
FIG. 10 illustrates a variant of the method of FIG. 1 according to an embodiment of the present disclosure.

FIG. 10 shows a further embodiment of the multi-point calibration procedure 100 of FIG. 1. In particular, FIG. 10 is identical to FIG. 1 with the exception that the multi-point calibration procedure 100 can further comprise flagging 71 the re-calculated calibration result 20' of the multi-point calibration procedure 100 before ending 70 of the multi-point calibration procedure 100 if repetition of the procedure only for the failed calibration point(s) 1-n is automatically triggered 60 in order to enable later user verification. Flagging the re-calculated calibration result 20' may comprise flagging the repeated calibration point(s) 1-n. A similar example can be made starting from the multi-point calibration procedure of FIG. 2.

Figure 11:
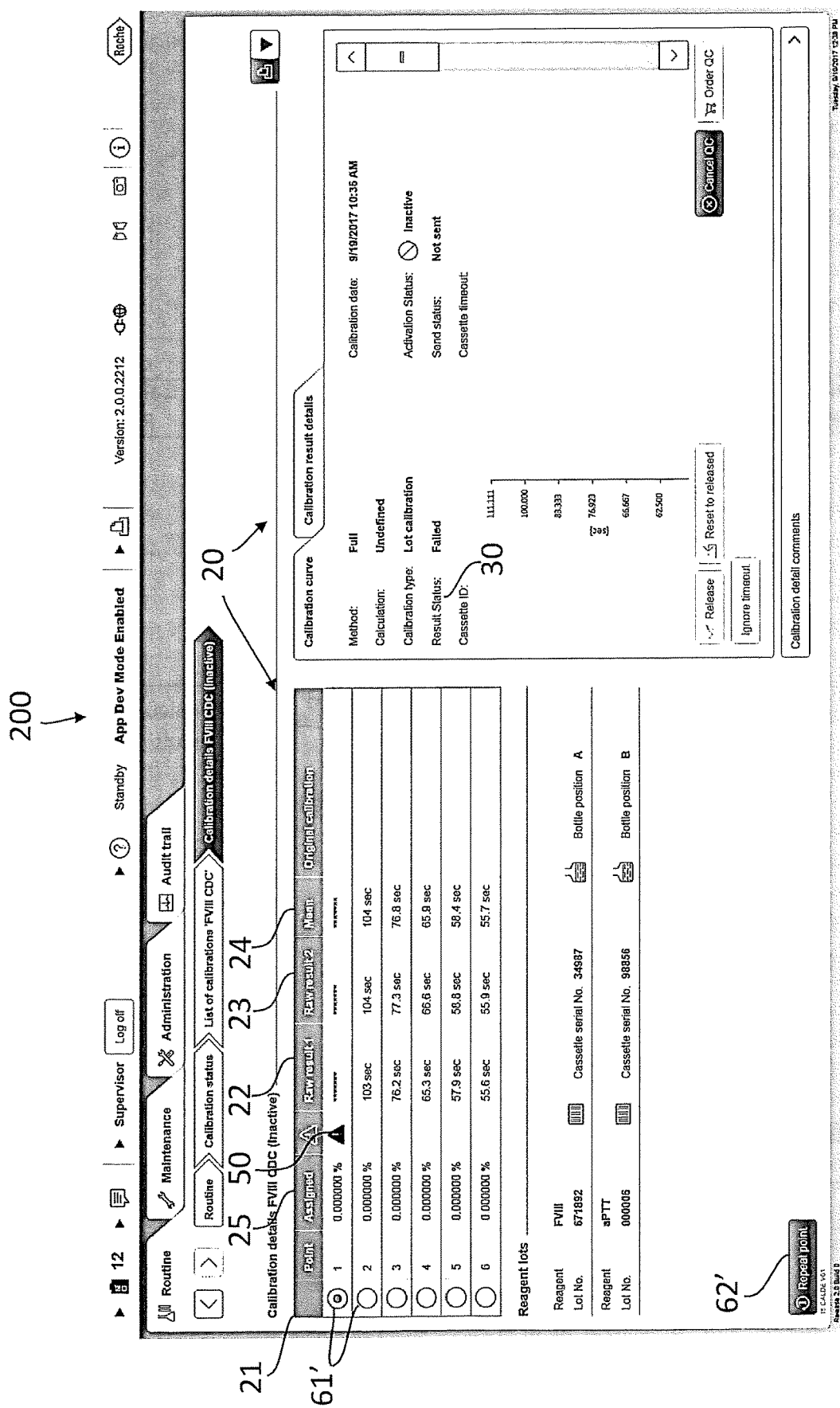
FIG. 11 illustrates an example of user interface comprising displaying calculation results of a calibration procedure according to an embodiment of the present disclosure.
Figure 12:
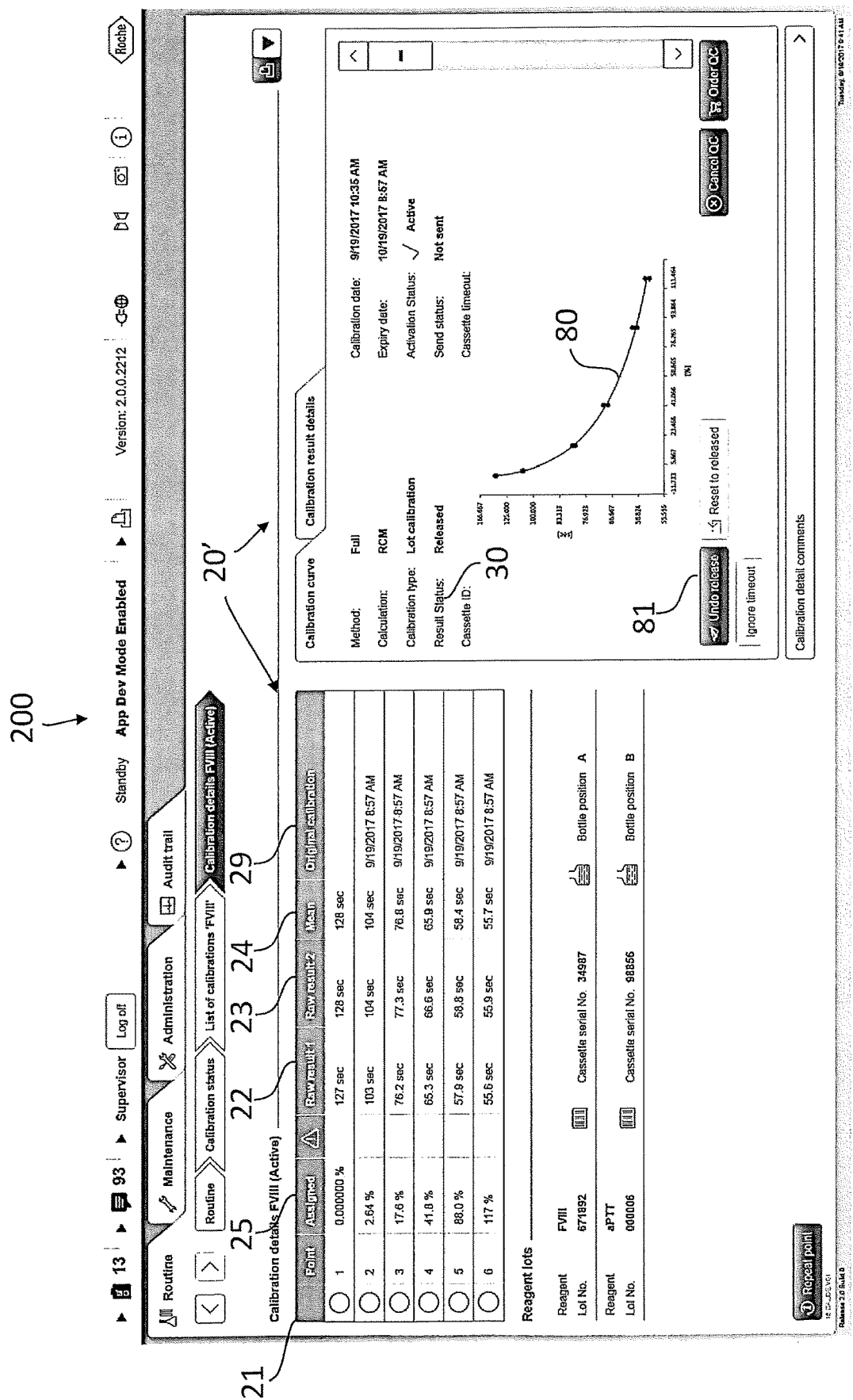
FIG. 12 illustrates a continuation of the example of FIG. 11 according to an embodiment of the present disclosure.

FIG. 11 is an example of user interface 200 comprising displaying calculation results 20 of a multi-point calibration procedure. FIG. 12 is a continuation of the example of FIG. 11 comprising displaying re-calculation results 20' of the same multi-point calibration procedure. FIG. 11 and FIG. 12 can be better understood when directly compared to each other. In particular, the multipoint calibration procedure related to FIGS. 11-12 can be a combination of the multipoint calibration procedure 100' of FIG. 2 and the multipoint calibration procedure 100" of FIG. 8. In particular, in FIG. 11, the displayed calculation results 20 can comprise a table 21, reporting in separate columns pairs of measurement data 22, 23 and the mean value 24 of the pair of measurement data for each of 6 calibrator levels corresponding to calibration points 1-6 respectively. The table 21 can further comprise a column 25 with an assigned normalized value related to concentration. In this example, it can be seen that a failure 50 can be indicated in relation to calibration point 1. Also, no measurement data can be indicated for calibration point 1. A possible reason for missing measurement data in this case can be a pipetting error that caused, for example, air instead of calibrator to be aspirated. Also, no normalized values can be assigned to any calibration point 1-6. Also, no calibration curve can be plotted. In this case, it can be determined 30 that the multi-point calibration procedure failed and that failure can be related to failure of calibration point 1.

The method can further comprise displaying selection areas 61', 62' for selecting and/or confirming failed calibration point(s) including an instruction button 28 for starting repetition of measurement of the calibrator level with respect to the failed calibration point 1 only.

Turning now to FIG. 12, the re-calculation result 20' of the multi-point calibration procedure can be displayed after repeating the failed calibration point 1 only. In the table 21, measurement data 22, 23 and mean value 24 can now be indicated for the repeated calibration point 1, whereas all other measurement data and mean values for the other calibration points 2-6 can be left unchanged. In particular, in a new column 29 of the table 21, it can be indicated with a time stamp that they had already been previously measured and can be taken over for re-calculating the result 20'. Also, normalized concentration values can be assigned now to all calibration points 1-6 in column 25, where the value 0% with respect to calibration point 1 can refer to a blank calibrator. Also, the measurement data 22, 23 and mean values 24 in seconds (s) can be plotted versus the assigned normalized concentration values 25 in % and the calibration curve 80 fitting all calibration points, including the repeated calibration point 1, can also be plotted. In this case, passing of the multi-point calibration procedure can be determined 30 (the multi-point calibration procedure can be released).

An undo release button 81 can also be displayed in order to give the opportunity to reject the re-calculation result 20' and eventually repeat the entire multi-point calibration procedure.

It can be emphasized that this is only an example and that displaying of the calculation result 20 and re-calculation result 20' may look different and reflect any of the embodiments of FIG. 1 to FIG. 10 and combinations thereof.

Reference throughout the preceding specification to "one embodiment", "an embodiment", "one example" or "an example", can mean that a particular feature, structure or characteristic described in connection with the embodiment or example is included in at least one embodiment. Thus, appearances of the phrases "in one embodiment", "in an embodiment", "one example" or "an example", in various places throughout this specification may not be necessarily all referring to the same embodiment or example.

Furthermore, the particular features, structures, or characteristics may be combined in any suitable combinations and/or sub-combinations in one or more embodiments or examples.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A computer-implemented method of calibrating an in-vitro diagnostic analyzer, the method comprising:
    executing a multi-point calibration procedure comprising measuring a plurality of calibrator levels and thereby obtaining a plurality of respective calibration points (1-$n$), wherein the calibrator levels correspond to different concentration ranges of calibration material that fall in a range of detection of the in-vitro diagnostic analyzer;
    calculating a result of the multi-point calibration procedure and determining failure or passing of the multi-point calibration procedure based on the calculated result; and
    in the case of failure of the multi-point calibration procedure, determining if failure is related to one or more individual failed calibration point(s) (1-$n$) and, in the affirmative, triggering a repetition of measuring the calibrator level(s) only with respect to the failed calibration point(s) and re-calculating the result of the multi-point calibration procedure after replacing only the failed calibration point(s) with the newly obtained calibration point(s).

2. The method according to claim 1, wherein the multi-point calibration procedure and/or repetition of measuring the calibrator level(s) comprises measuring the respective calibrator level for each calibration point (1-$n$) in duplicate in order to obtain a pair of measurement data for each calibration point (1-$n$).

3. The method according to claim 2, wherein determining if failure is related to one or more individual failed calibration point(s) comprises comparing a deviation of each calibration point or average value between duplicate measurement data for each calibration point from a fitted multi-point calibration curve.

4. The method according to claim 2, wherein determining if failure is related to one or more individual failed calibration point(s) comprises comparing the duplicate measurement data for each calibration point respectively and determining if their difference in value exceeds a predetermined threshold.

5. The method according to claim 2, wherein determining if failure is related to one or more individual failed calibration point(s) comprises comparing reaction curves associated to the duplicate measurement data for each calibration point (1-*n*) respectively and determining if the reaction curves substantially differ from each other.

6. The method according to claim 1, wherein determining if failure is related to one or more individual failed calibration point(s) (1-*n*) comprises assessing one or more predetermined operational parameters (1-*n*) of the in-vitro diagnostic analyzer that can be associated with the failure of the failed calibration point(s) (1-*n*).

7. The method according to claim 6, wherein the method comprises comparing the one or more predetermined operational parameters (1-*n*) in relation to the execution of the duplicate measurements for each calibration point (1-*n*) respectively.

8. The method according to claim 1, wherein triggering a repetition of measuring the calibrator level(s) only for the failed calibration point(s) comprises indicating possibly failed calibration point(s) to be repeated and requesting user confirmation of the indicated calibration point(s).

9. The method according to claim 1, wherein, if it cannot be automatically determined that failure of the multi-point calibration procedure is related to one or more individual failed calibration point(s) (1-*n*), the method further comprises,
- requesting user selection of the failed calibration point(s);
- triggering the repetition of measuring the calibrator level(s) only for the selected calibration point(s); and
- re-calculating the result of the multi-point calibration procedure after replacing only the selected calibration point(s) with the newly obtained calibration point(s).

10. The method according to claim 9, further comprising,
- setting a time limit for user confirmation or user selection; and
- if the time limit is exceeded, triggering a repetition of the entire multi-point calibration procedure.

11. The method according to claim 1, further comprising, flagging the re-calculated calibration result of the multi-point calibration procedure if repetition of measuring the calibrator level(s) only for the failed calibration point(s) is automatically triggered in order to enable later user verification.

12. The method according to claim 1, further comprising,
- displaying the calculated result of the multi-point calibration procedure and/or of the re-calculated result of the multi-point calibration procedure after replacing only the failed calibration point(s); and
- directly comparing the two results.

13. The method according to claim 12, wherein displaying comprises listing and/or plotting the duplicate measurement data for each calibration point.

14. The method according to claim 12, wherein displaying comprises indicating failed or possibly failed calibrations point(s) and/or repeated calibration points.

15. The method according to claim 12, wherein displaying comprises displaying selection areas for selecting and/or confirming failed calibration point(s).

* * * * *